(12) United States Patent  (10) Patent No.: US 8,541,714 B2
Gu  (45) Date of Patent: Sep. 24, 2013

(54) METHOD AND SYSTEM FOR LASER PROCESSING TARGETS OF DIFFERENT TYPES ON A WORKPIECE

(75) Inventor: Bo Gu, North Andover, MA (US)

(73) Assignee: Electro Scientific Industries, Inc., Portland, OR (US)

( * ) Notice: Subject to any disclaimer, the term of this patent is extended or adjusted under 35 U.S.C. 154(b) by 435 days.

(21) Appl. No.: 12/793,306

(22) Filed: Jun. 3, 2010

(65) Prior Publication Data

US 2010/0237051 A1    Sep. 23, 2010

Related U.S. Application Data

(62) Division of application No. 11/900,731, filed on Sep. 13, 2007, now Pat. No. 7,732,731.

(60) Provisional application No. 60/844,822, filed on Sep. 15, 2006.

(51) Int. Cl.
*B23K 26/38* (2006.01)
*B23K 26/04* (2006.01)

(52) U.S. Cl.
USPC ............. 219/121.68; 219/121.62; 219/121.83

(58) Field of Classification Search
USPC ............. 219/121.61, 121.62, 121.68, 121.69, 219/121.8, 121.81; 372/25, 38.02
See application file for complete search history.

(56) References Cited

U.S. PATENT DOCUMENTS

| 4,179,310 A | 12/1979 | Compton et al. |
| 5,300,756 A | 4/1994 | Cordingley |
| 5,670,067 A * | 9/1997 | Koide et al. ............. 219/121.68 |
| 5,998,759 A | 12/1999 | Smart |
| 6,151,338 A | 11/2000 | Grubb et al. |
| 6,172,325 B1 * | 1/2001 | Baird et al. ............. 219/121.62 |
| 6,281,471 B1 * | 8/2001 | Smart ...................... 219/121.62 |

(Continued)

FOREIGN PATENT DOCUMENTS

| WO | WO-98/22252 A1 * | 5/1998 |
| WO | 0147659 A1 | 7/2001 |
| WO | 03084012 A1 | 10/2003 |
| WO | WO-2004/010550 A1 * | 1/2004 |

OTHER PUBLICATIONS

International Search Report and Written Opinion dated Aug. 21, 2008 from the corresponding PCT Serial No. PCT/US07/78460 dated Sep. 14, 2007.

*Primary Examiner* — Geoffrey S Evans
(74) *Attorney, Agent, or Firm* — Brooks Kushman P.C.

(57) ABSTRACT

A method and system for laser processing targets of different types on a workpiece are provided. The method includes setting a laser pulse width of one or more laser pulses to selectively provide one or more laser output pulses having one or more set pulse widths based on a first type of target to be processed. The method further includes setting a pulse shape of the one or more output pulses to selectively provide the one or more output pulses having the set pulse shape based on the types of targets to be processed. The method still further includes delivering the one or more output pulses having the one or more set pulse widths and the set pulse shape to at least one target of the first type. The method finally includes resetting the laser pulse width of one or more laser pulses to selectively provide one or more laser output pulses having one or more reset pulse widths based on a second type of target to be processed.

16 Claims, 4 Drawing Sheets

(56) References Cited

U.S. PATENT DOCUMENTS

| | | | |
|---|---|---|---|
| 6,340,806 B1 | 1/2002 | Smart et al. | |
| 6,483,071 B1 | 11/2002 | Hunter et al. | |
| 6,495,791 B2 | 12/2002 | Hunter et al. | |
| 6,573,473 B2 | 6/2003 | Hunter et al. | |
| 6,639,177 B2 | 10/2003 | Ehrmann et al. | |
| 6,662,063 B2 | 12/2003 | Hunter et al. | |
| 6,703,582 B2 | 3/2004 | Smart et al. | |
| 6,727,458 B2 | 4/2004 | Smart | |
| 6,777,645 B2 | 8/2004 | Ehrmann et al. | |
| 6,913,603 B2 | 7/2005 | Knopp et al. | |
| 6,951,995 B2 | 10/2005 | Couch et al. | |
| 6,972,268 B2 | 12/2005 | Ehrmann et al. | |
| 6,987,786 B2 | 1/2006 | Cordingley et al. | |
| 6,989,508 B2 | 1/2006 | Ehrmann et al. | |
| 7,015,418 B2 | 3/2006 | Cahill et al. | |
| 7,027,155 B2 | 4/2006 | Cordingley et al. | |
| 7,119,351 B2 | 10/2006 | Woelki | |
| 7,148,447 B2 | 12/2006 | Ehrmann et al. | |
| 7,176,407 B2 | 2/2007 | Hunter et al. | |
| 7,192,846 B2 | 3/2007 | Cordingley et al. | |
| 7,259,321 B2 | 8/2007 | Oswald et al. | |
| 7,358,157 B2 | 4/2008 | Gu et al. | |
| 7,462,801 B1* | 12/2008 | Hiramatsu | 219/121.7 |
| 2002/0020879 A1 | 2/2002 | Shiiki et al. | |
| 2002/0024978 A1* | 2/2002 | Inagaki et al. | 372/20 |
| 2002/0141473 A1* | 10/2002 | Cordingley et al. | 219/121.6 |
| 2002/0167581 A1* | 11/2002 | Cordingley et al. | 347/173 |
| 2004/0134896 A1 | 7/2004 | Gu et al. | |
| 2004/0144760 A1 | 7/2004 | Cahill et al. | |
| 2004/0188399 A1 | 9/2004 | Smart | |
| 2004/0228376 A1* | 11/2004 | Dane et al. | 372/32 |
| 2005/0150880 A1 | 7/2005 | Gu et al. | |
| 2005/0199598 A1 | 9/2005 | Hunter et al. | |
| 2005/0233537 A1 | 10/2005 | Couch et al. | |
| 2006/0000814 A1 | 1/2006 | Gu et al. | |
| 2006/0028655 A1 | 2/2006 | Cordingley et al. | |
| 2006/0029111 A1* | 2/2006 | Liu | 372/6 |
| 2006/0086702 A1 | 4/2006 | Smart | |
| 2006/0108337 A1 | 5/2006 | Gu et al. | |
| 2006/0126676 A1* | 6/2006 | Hollemann et al. | 372/30 |
| 2006/0126678 A1* | 6/2006 | Sun et al. | 372/30 |
| 2006/0151704 A1 | 7/2006 | Cordingley | |
| 2006/0186096 A1 | 8/2006 | Schramm | |
| 2006/0189091 A1 | 8/2006 | Gu | |
| 2006/0191884 A1 | 8/2006 | Johnson et al. | |
| 2006/0192845 A1 | 8/2006 | Cordingley et al. | |
| 2006/0199354 A1 | 9/2006 | Gu | |
| 2006/0205121 A1 | 9/2006 | Couch et al. | |
| 2006/0207975 A1 | 9/2006 | Ehrmann et al. | |
| 2006/0216927 A1 | 9/2006 | Cordingley et al. | |
| 2006/0256181 A1 | 11/2006 | Ehrmann et al. | |
| 2007/0031993 A1 | 2/2007 | Nemets et al. | |
| 2007/0052791 A1 | 3/2007 | Cordingley et al. | |
| 2007/0075058 A1 | 4/2007 | Ehrmann et al. | |
| 2007/0106416 A1 | 5/2007 | Griffiths et al. | |
| 2007/0117227 A1 | 5/2007 | Gu | |
| 2007/0173075 A1 | 7/2007 | Lee et al. | |
| 2007/0178714 A1 | 8/2007 | Gu et al. | |
| 2007/0199927 A1 | 8/2007 | Gu et al. | |
| 2007/0215575 A1 | 9/2007 | Gu et al. | |
| 2007/0215820 A1 | 9/2007 | Cordingley et al. | |
| 2008/0011852 A1 | 1/2008 | Gu et al. | |
| 2008/0025351 A1* | 1/2008 | Loesel | 372/25 |
| 2008/0035614 A1 | 2/2008 | Smart | |
| 2008/0073438 A1 | 3/2008 | Gu et al. | |
| 2008/0094640 A1 | 4/2008 | Cordingley et al. | |

* cited by examiner

US 8,541,714 B2

METHOD AND SYSTEM FOR LASER PROCESSING TARGETS OF DIFFERENT TYPES ON A WORKPIECE

CROSS-REFERENCE TO RELATED APPLICATIONS

This application is a divisional of prior U.S. application Ser. No. 11/900,731 filed Sep. 13, 2007, now U.S. Pat. No. 7,732,731, which claims benefit of U.S. provisional application No. 60/844,822, filed 15 Sep. 2006.

BACKGROUND OF THE INVENTION

1. Field of the Invention

This invention relates to methods and systems for laser processing targets of different types on a workpiece.

2. Background Art

Laser trimming has been a part of manufacturing processes in the semiconductor and microelectronics industries for more than 30 years. The industry has been introducing new link materials and structures, as well as different thin films and structures. One of the challenges for laser processing is to meet the needs to process all these devices with a single laser trimming system. For example, the processing conditions and the types of lasers needed for copper processing are not the same for processing conventional polysilicon links. So a laser trimming system designed for processing polysilicon links may not be able to process copper links effectively.

Another challenge is that the processing conditions and the types of lasers needed for metal link blowing or cutting may not be the best for the conventional thin film trimming. For example, a laser trimming system designed for processing copper links may not be able to process and trim thin film resistors effectively. In addition, different thin films require different processing conditions as well. In a laser processing system such as the model M310 product of the assignee of the present application, various thin film trimming jobs require different laser pulse widths, for example 7 ns and 50 ns pulse widths. Current M310/M350 systems of the assignee of this application are built with a selected laser having a single desired pulse width. However, the pulse width cannot be tuned or adjusted easily. This limits the system to a narrow range of product processing at the selected pulse width. Currently, when there are different types of targets or circuit elements to be laser processed with different laser pulse widths, multiple processing systems provide the needed different pulse width lasers. These systems may be underutilized depending on a mix of products with varying target types, thus reducing system value to the customer. A system for processing multiple types of devices with a single laser source therefore will add value to the customer.

Except where indicated, the following patents and patent applications are assigned to the assignee of the present invention and are hereby incorporated by reference in their entirety:

U.S. Pat. No. 5,300,756 (the '756 patent) entitled "Method For Severing Integrated-Circuit Connection Paths By A Phase-Plate-Adjusted Laser Beam."

U.S. Pat. No. 5,998,759 (the '759 patent) entitled "Laser Processing."

U.S. Pat. No. 6,727,458 (the '458 patent) entitled "Energy-Efficient, Laser-Based Method And System For Processing Target Material."

U.S. Pat. No. 6,777,645 (the '645 patent) entitled "High-Speed, Precision, Laser-Based Method And System For Processing Material Of One Or More Targets Within A Field."

U.S. Pat. No. 6,951,995 (the '995 patent) entitled "Method And System For High-Speed, Precise Micromachining An Array Of Devices."

U.S. Pat. No. 6,987,786 (the '786 patent) entitled "Controlling Laser Polarization."

Published U.S. Patent Publication No. 2002/0167581 (the '7581 publication) entitled "Methods And Systems For Thermal-Based Laser Processing."

Published U.S. Patent Publication No. 2006/0108337 (the '8337 publication) entitled "Method And System For Laser Soft Marking."

Published U.S. Patent Publication No. 2004/0188399 (the '8399 publication) entitled "Energy-Efficient, Laser-Based Method And System For Processing Target Material."

U.S. Pat. No. 6,151,338 (not assigned to the assignee of the present invention) discloses a high power laser optical amplifier system for material processing.

SUMMARY OF THE INVENTION

An object of the present invention is to provide an improved method and system for laser processing targets of different types on a workpiece.

In carrying out the above object and other objects of the present invention, a method of laser processing targets of different types on a workpiece is provided. The method includes setting a laser pulse width of one or more laser pulses to selectively provide one or more laser output pulses having one or more set pulse widths based on a first type of target to be processed. The method further includes setting a pulse shape of the one or more output pulses to selectively provide the one or more output pulses having the set pulse shape based on the types of targets to be processed. The method still further includes delivering the one or more output pulses having the one or more set pulse widths and the set pulse shape to at least one target of the first type. The method finally includes resetting the laser pulse width of one or more laser pulses to selectively provide one or more laser output pulses having one or more reset pulse widths based on a second type of target to be processed.

The set and reset pulse widths may be selectable over a continuous range of 1 nanosecond to 200 nanoseconds.

The range may be 4 nanoseconds to 50 nanoseconds.

The pulse width may be programmable.

The output pulses may be delivered by a laser beam delivery subsystem. The laser beam may have a flat top profile.

The set pulse shape may be a square pulse shape.

The delivered output pulses may have a pulse energy in a range of 0.1 microjoules to 5 microjoules.

The range may be 0.2 microjoules to 1.5 microjoules.

The laser pulses may be generated by a pulse-shaped laser. The pulse-shaped laser may have a repetition rate in a range of 1 kHz to 200 kHz.

The repetition rate may have a range of 1 kHz to 50 kHz.

The output pulses may have a rise time of less than 1.5 nanoseconds and a fall time of less than 2 nanoseconds.

The output pulses may have a $TEM_{00}$ mode.

The output pulses may have a wavelength in the range of 0.2 microns to 2.5 microns.

The wavelength may be about 1 micron.

The wavelength may be about 1.2 microns.

The wavelength may be about 1.3 microns.

One of the different types of targets may be a thick or thin film-based device.

The devices may be circuit elements.

The devices may be thin film resistance elements.

The different types of targets may be links.

The links may include metal links.

The links may include polysilicon links.

The metal links may include at least one of aluminum, gold and copper links.

The workpiece may include a semiconductor substrate.

The targets may comprise circuit elements.

The circuit elements may include a bank of links of a first material and a bank of links of a second material different from the first material.

The circuit elements may include a bank of links and a thick or thin film-based device.

The processing may include trimming.

The trimming may be at least one of passive and functional trimming

At least one of the steps of setting may be repeated after all targets of the same or similar material on the workpiece are processed.

At least one of the steps of setting may be repeated during processing of targets made of different material on the workpiece.

Further in carrying out the above object and other objects of the present invention, a system for laser processing targets of different types on a workpiece is provided. The system includes a laser subsystem for generating one or more laser pulses. The system further includes a controller operatively connected to the laser subsystem to set a laser pulse width of the one or more laser pulses to selectively provide one or more laser output pulses having one or more set pulse widths based on a first type of target to be processed. The controller is also operatively connected to the laser subsystem to set a pulse shape of the one or more output pulses to selectively provide the one or more output pulses having the set pulse shape based on the first type of target, and to reset the laser pulse width of one or more laser pulses to selectively provide one or more laser output pulses having one or more reset pulse widths based on a second type of target to be processed. The system still further includes a laser beam delivery subsystem including an optical subsystem for delivering the output pulses having the set pulse shape and the set and reset pulse widths to the first and second types of targets, respectively.

The laser beam delivery subsystem may selectively deliver the output pulses to the targets based on position information.

The laser subsystem may include a single pulse-shaped and pulse width tunable laser.

The laser subsystem may include a fiber laser.

The laser subsystem may include a fast rise, fast fall, pulse-shaped laser.

The laser subsystem may include a Q-switched laser.

The laser subsystem may have a MOPA configuration and may include an oscillator and an amplifier.

The oscillator may include a tunable or adjustable pulse width, semiconductor laser.

The amplifier may include a fiber-based amplifier.

The laser subsystem may include a laser which may have an output coupler and a laser cavity. The geometry and dimensions of the laser cavity may be adjusted and reflectivity of the output coupler may be adjusted to set the pulse width.

The controller may set the pulse width by changing pulse energy level of a laser of the laser subsystem.

The controller may set the pulse width by changing repetition rate of a laser of the laser subsystem.

The system may further include a sensor subsystem including an optical sensor for sensing a laser pulse reflected from the workpiece to obtain a signal and a signal processor for processing the signal to obtain alignment information for laser processing.

The laser beam may be initially linearly polarized. The system may further include a LCVR and a LCVR controller for controlling the LCVR so that the LCVR controllably rotates the linearly polarized laser beam based upon alignment of the targets.

The laser beam may have an initial polarization. The system may further include a LCVR and an LCVR controller for controlling the LCVR so that the LCVR controllably converts the initial polarization to a desired polarization.

The optical subsystem may adjust at least one of spot size and the focus of the laser beam on the at least one target.

The system may further include a positioning mechanism for providing relative motion between the workpiece and the laser beam.

Still further in carrying out the above object and other objects of the present invention, a laser-based material processing method is provided. The method includes providing a first target of a first type on a die and providing a second target of a second type on the die. The first and second types are different types. The method further includes processing the first and second targets with a single pulse-shaped laser having an adjustable pulse width.

One purpose of at least one embodiment of this invention is to provide a laser system/processing method and system to process various kinds of links, including polysilicon, aluminum, gold and copper links on a wafer.

Another purpose of at least one embodiment of this invention is to provide a laser processing method and system that uses a single laser source for a wide range of processing applications, for example, to cut or blow different kinds of links, as well as to trim thin or thick film resistors on a wafer.

One embodiment of the invention improves a link blowing process window by using a pulse-shaped and pulse width adjustable laser, preferably, a fiber laser. In order to achieve that, a fast rise ($<1.5$ ns)/fall ($<2$ ns), a pulse-shaped (square shape preferred) q-switched laser can be used. One can also use a MOPA configuration. One of the choices for the MOPA oscillator can be a tunable or adjustable pulse width diode laser. One of the choices for the MOPA amplifier can be a fiber laser amplifier. Beam shaping optics may be used to generate a flat-top beam profile to improve laser processing.

A fast rise/fall, pulse-shaped laser gives rise to more efficient processes by better coupling the laser energy into the material. This is especially significant for metal links. Fast fall time prevents excess energy from the tail of the typical Q-switch pulse impinging the material, thus reducing substrate damage. Furthermore, with less residual energy in the neighboring zone near the trim path, less HAZ is generated. It is, therefore, preferred in at least one embodiment of the invention that a fast rise/fall, pulse-shaped laser be used for processing metal links such as copper or gold links.

Another aspect of the laser of embodiments of the invention is the adjustability of the laser pulse duration (pulse width). Different pulse durations can be selected in the laser trimming or processing system to blow or cut both metal links and trim thin or thick film circuit elements, respectively. Flexible adjustment of the pulse duration allows one to independently optimize the process window for the metal link blowing or cutting process, as well as for the thin or thick film trimming process. Flexible adjustment of the pulse duration may also allow one to optimize other laser material processing tasks.

Because the pulse widths of the laser suggested here can be easily adjusted, one can optimize the pulse widths together with pulse energy and other beam characteristics like beam size to achieve an improved processing condition for thin and thick film trimming.

By spatially beam shaping the laser beam from the conventional Gaussian to a flat top profile, energy can be efficiently coupled, reducing heating of the area adjacent to and along the trim path and to the underlying substrate. Because energy is more efficiently coupled into the trim kerf, less HAZ will be produced for the same total energy with less damage to the substrate. It is, therefore, suggested here in at least one embodiment of the invention that a spatially shaped beam, preferably a flat-top beam profile, be used for trimming or cutting.

In addition to the shaped pulse, the pulse duration of the laser is also made easily adjustable. One can easily select a particular pulse width for a particular thin or thick film material and structure, thus eliminating the need for multiple laser sources in a single material processing system.

The above features and advantages are readily apparent from the following detailed description of the best mode when taken in connection with the accompanying drawings.

DETAILED DESCRIPTION OF THE PREFERRED EMBODIMENT(S)

Figure 1:
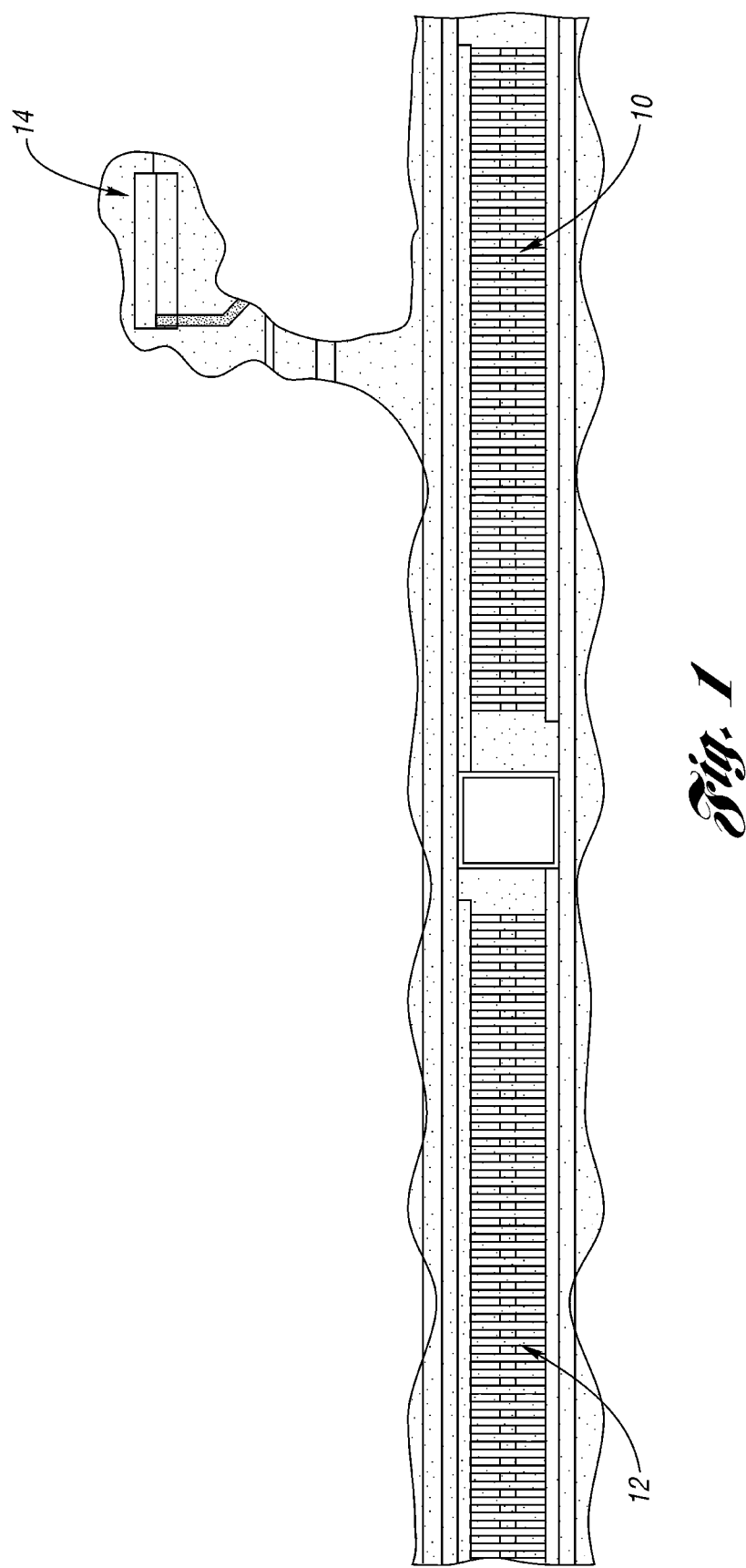
FIG. 1 is a top schematic view, partially broken away, of a die of a semiconductor wafer; there are thin film resistance elements as well as metal links (i.e., copper, gold or Al etc.) on the die; another possible combination of devices to be processed would include thick film-based devices.

Referring to FIG. 1, there is illustrated a portion of a die of a semiconductor wafer having numerous circuit elements formed thereon. The circuit elements include a bank 10 of 2 micron gold links and a bank 12 of 2 micron copper links as well as a SiCr, tantalum nitride or NiCr thin film resistive element 14, any of which can be processed with the method and system of one embodiment of the present invention.

Figure 2:
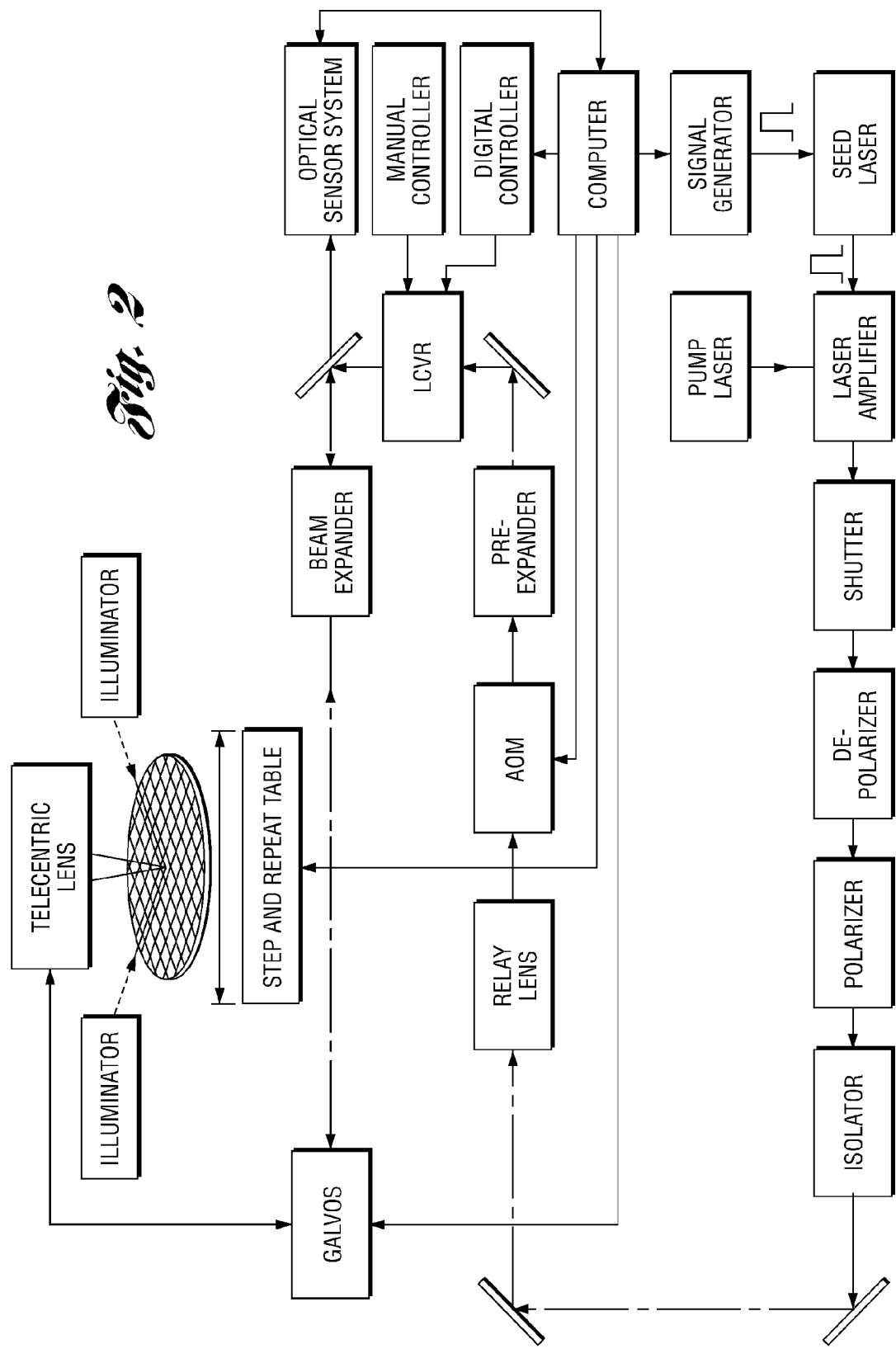
FIG. 2 is a schematic block diagram of a laser processing system constructed in accordance with an embodiment of the present invention.
Figure 5:
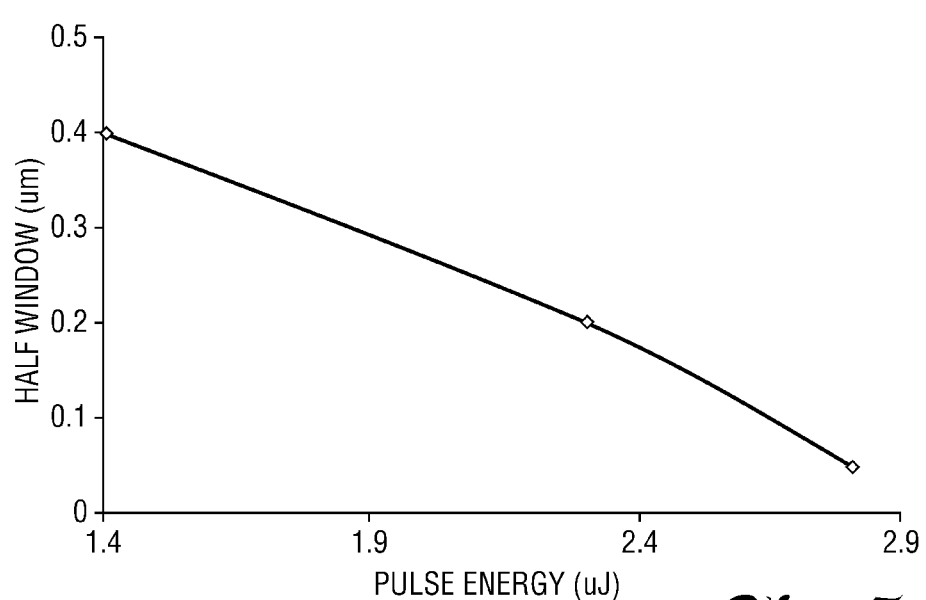
FIG. 5 is a graph of a positioning accuracy half window (in microns) versus pulse energy (in micro-joules) which shows accuracy window with a 4 micron spot on copper links; this graph indicates the variation in maximum pulse energy that can be applied to the link as a function of spot position relative to the center of the link, without causing the optically observed damage; the half window here represents the maximum spot position deviation from the center of the link achieved at each laser pulse energy without observing optical damage.
Figure 7:
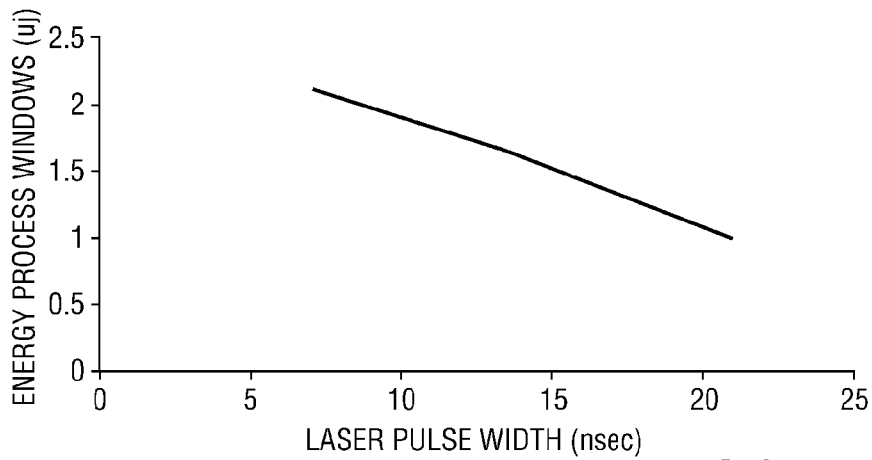
FIG. 7 is a graph of energy process window (in micro-joules) versus laser pulse width (in nsec) which shows energy process window as a function of pulse width (for gold links); the energy process window (in micro-joules) here is the range of the laser pulse energies between the minimum energy needed for severing the links and the maximum energy at which dark spot observed under the links.

Referring now to FIG. 2, there is shown a laser material processing system constructed in accordance with an embodiment of the present invention. The system includes a laser subsystem as illustrated in FIGS. 5 and 7 of the above-noted '458 patent and as described in the corresponding portions of the '458 patent.

In a preferred embodiment, the laser subsystem utilizes a master oscillator, power amplifier (MOPA) configuration. This system produces a laser pulse that seeds an amplifier to produce a high power short rise time pulse. A seed laser produces fast rise time, short pulse width at very low energy levels. A laser amplifier produces enough energy to do material processing. In FIG. 2, the seed laser in combination with the laser amplifier are commonly referred to as a fiber laser.

Figure 3:
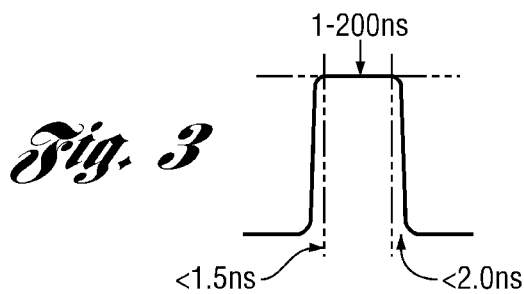
FIG. 3 is a graph of power (y-axis) versus time (x-axis) for a laser material processing pulse generated in accordance with one embodiment of the present invention.

A fiber laser amplifier and a high-speed infrared laser diode having an output wavelength suitable for a laser processing application is preferred. This fiber laser system produces a laser pulse of the preferred shape and speed as shown in FIG. 3 that is, a fast rise time pulse, square at the top and a fast fall time. This pulse shape, in turn, provides the desired laser material interaction results of reduction in metal reflectivity and low diffusion of the energy into the device.

Preferably, a laser pulse width will be easy to set, and may be programmable. One such example is a fiber laser from IPG Photonics that is used by the assignee of the present invention in certain M430 memory repair systems. Laser pulse widths can be selected over a continuous range from 4 ns to 20 ns.

Published U.S. patent application 2004/0188399, assigned to the assignee of the present invention, discloses various laser system embodiments useable for creating or removing a feature on a surface. By way of example, a MOPA system having a fiber optic amplifier is disclosed. The laser processing system may include an output subsystem having an A-O modulator. The MOPA and output modulator are controlled to selectively direct one or more laser pulses to the target material based on position information. Each of the output pulses incident of the surface may have a different pulse width.

Another way to set a pulse width is to adjust the laser cavity geometry and dimensions, as well as the reflectivity of the output coupler. The laser pulse width can be changed by varying the cavity length and the output coupler reflectivity. The curvatures of both cavity mirrors (the total reflector and the output coupler) may also be changed when the total cavity length is changed according to the laser resonator configuration. Theory and operation of laser resonators can be found in many text books, handbooks, and catalogs provided by laser manufacturers. One such reference is "Lasers" by Peter Milonni and Joseph Eberrly, published by John Wiley & Sons 1988. Chapter 14 entitled "Laser Resonators" describes in detail the theory and principles of the laser cavity.

Another way to set a pulse width is to take advantage of a variable laser characteristic, i.e., the pulse width decreases with the increase of the laser energy. One can run the laser to a higher pulse energy level to obtain the needed pulse width, and then externally attenuate the beam to achieve the required energy density.

In order to set or re-set a pulse width, one may also exploit another variable laser characteristic, i.e., the pulse width increases with the repetition rate of the laser.

Referring again to FIG. 2, the laser diode which has sub-nanosecond rise time in response to a modulating drive waveform is a starting point in the fiber laser MOPA configuration, with the laser diode as a seed laser. The laser diode generally has multiple longitudinal modes and the subsystem can be configured for single mode operation or otherwise tuned with bulk components at the output or, alternatively, with integrated fiber gratings in the system.

The system of FIG. 2 also includes a lens (not shown) to collimate the fiber output, a conventional shutter, a de-polarizer, a polarizer, an isolator (to prevent back reflection), mirrors, a beam splitter, a relay lens, an AOM (acousto optic modulator) and a pre-expander, all of which are well known in the art and are disclosed in numerous patents which describe fiber lasers.

The system of FIG. 2 also includes an optional AC voltage-controlled liquid crystal variable retarder (LCVR) and mount. The LCVR includes a birefringent liquid crystal sandwiched between two plates. As is known in the art, the birefringent liquid crystal can rotate the polarization of a laser beam, because light moves at different speeds along different axes through the birefringent liquid crystal, resulting in a phase shift of the polarization. Here, the LCVR rotates the linearly polarized beam so that one can have any linearly polarized beam on the target (links) with polarization in parallel to or perpendicular to link length orientation. Moreover, the birefringent liquid crystal can also transform the linearly polarized laser input into an elliptically or circularly polarized laser output. Laser beam maintains its polarization as it travels from LCVR to the work surface of the die to be processed.

The voltage applied to the liquid crystal variable retarder is controlled by a digital controller and/or a manual controller, which interface with liquid crystal variable retarder through a cable. The manual controller can be adjusted by a user in order to vary the voltage to the LCVR based on the user's knowledge of whether a link to be processed or blown is vertical or horizontal, for example. Digital controller receives input from the computer in order to automatically vary the voltage to LCVR based on information stored in the computer pertaining to the alignment of the links to be cut. This input from the computer controls the digital controller so as to cause an appropriate voltage to be applied to LCVR. The correct voltages to achieve horizontal polarization, vertical polarization, circular polarization, etc. can be determined experimentally.

In at least one embodiment, the digital controller is programmed to select among three different voltages corresponding to vertical linear polarization, horizontal linear polarization, and circular polarization. In other embodiments, the digital controller stores different voltages, including voltages corresponding to various elliptical polarizations. Other embodiments are also possible in which the optional liquid crystal variable retarder is capable of rotating linear polarization to numerous angles other than the vertical or the horizontal, in the event that polarization at such angles proves useful for some types of cutting or trimming of certain types of structures.

The system of FIG. 2 also includes a subsystem for delivering a focused beam to the targets on a single die of a semiconductor wafer. The laser beam positioning mechanism preferably includes a pair of mirrors and attached respective galvanometers (various available from the assignee of the present application). The beam positioning mechanism directs the laser beam through a lens (which may be telecentric or non-telecentric). Preferably, the lens has a scan field of at least 10 mm by 10 mm, a working distance of at least 40 mm to provide access for contacting probes and produces a spot of 6 microns or less. Most preferably, the laser spot size will be in the range of 4 to 5 microns.

The X-Y galvanometer mirror system may provide angular coverage over the entire wafer when sufficient field size and precision are maintained. Otherwise, various positioning mechanisms may be used to provide relative motion between the wafer and the laser beam. For instance, a two-axis precision step and repeat translator may be used to position the wafer galvanometer based mirror system (e.g., in the X-Y plane). The laser beam positioning mechanism moves the laser beam long two perpendicular axes, thereby providing two dimensional positioning of the laser beam across the wafer region. Each mirror and associated galvanometer moves the beam along its respective x or y axis under control of the computer.

The beam positioning subsystem may include other optical components, such as a computer-controlled, optical subsystem for adjusting the laser spot size and/or automatic focusing of the laser spot at a location of the die of the wafer.

The system of FIG. 2 may also include an optical sensor system in an alignment process. In one embodiment, an optical sensor of the system may include a camera (as described in the '995 patent) which operates in combination with a pair of illuminators as shown in FIG. 2. In another embodiment, the optical sensor of the system includes a single photo detector wherein a laser pulse is attenuated by the AOM and the attenuated pulse is sensed by the photo detector after being reflected back from the die. The reflection may be from an alignment feature or other structures used for alignment. Preferred alignment feature width is 0.5× to 2× the spot diameter, most preferred width equals the spot size.

The reflection may also be from a non-alignment feature. For example, the reflection may be from a link in a group of links to be processed whereby the reflection is used to determine a link edge to finely align the group of links for processing. In yet another embodiment, a low power laser (not shown in FIG. 2 but shown in FIG. 13 of the '7581 publication and described in the corresponding portion of the specification) can be used for optical inspection or detection purposes.

Semiconductor wafers having die which include copper links have been processed by cutting links with the laser material processing system of FIG. 2. The copper links were 2 µm wide with a 22 µm pitch. The processing system includes a fiber laser to generate shaped pulses with adjustable pulse widths, in this case, a square pulse shape. The spot size on the targets was about 4 µm. Die reference marks near each link bank (i.e., 28 links per bank) were used to confirm that the focal plane height was correct prior to link processing or blasting.

Links were processed using 7 ns, 13 ns, 16 ns, and 21 ns width pulses. All links were processed using polarization across the links as it gives the best results in terms of process window.

Results

The following table is a summary of the clean blow and darkening thresholds.

| Pulse width (ns) | Link visually severed threshold (μJ) | Link underside dark spot appearance threshold (μJ) |
|---|---|---|
| 7 | 2.2 | 2.4 |
| 13 | 1.2 | 2.6 |
| 16 | 1.0 | 2.4 |
| 21 | 1.2 | 1.8 |

It is clear that for processing copper links, the pulse shape, as well as the pulse width, are important for the best process window. In other words, the process window depends on both the pulse width and pulse shape.

Figure 4:
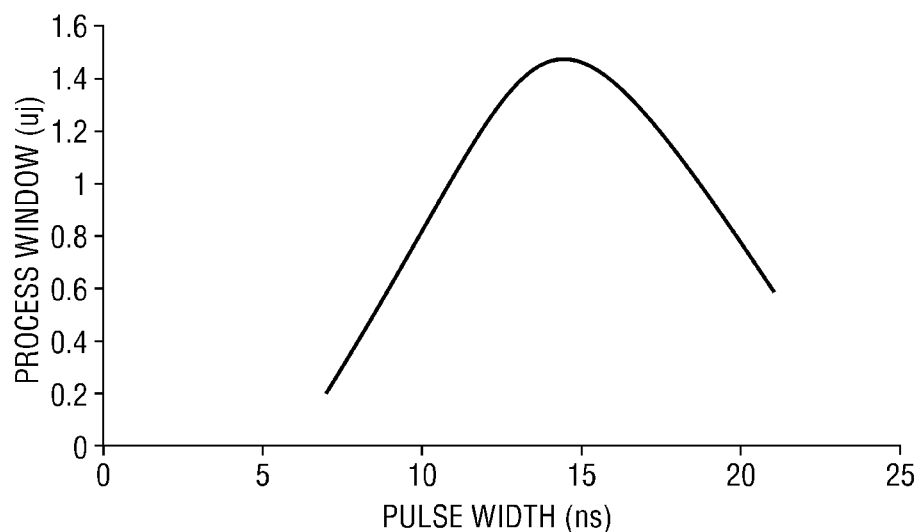
FIG. 4 is a graph of energy process window (in micro-joules) versus pulse width which shows the dependence of the energy process window on laser pulse width for copper links; an energy process window (in micro-joules) here is the range of the laser pulse energies between the minimum energy needed for severing the links and the maximum energy at which dark spot observed under the links.

The graph of FIG. 4 shows the dependence of energy process window on the laser pulse width for copper links.

Positioning accuracy tests were carried out by moving the center of the beam deliberately away from the center of the links and the same damage criteria were used to determine the damage, which is optically observed damage. The graph of FIG. 5 shows the beam positioning window for 4 μm spot size on copper link wafers using an IPG laser.

Figure 6:
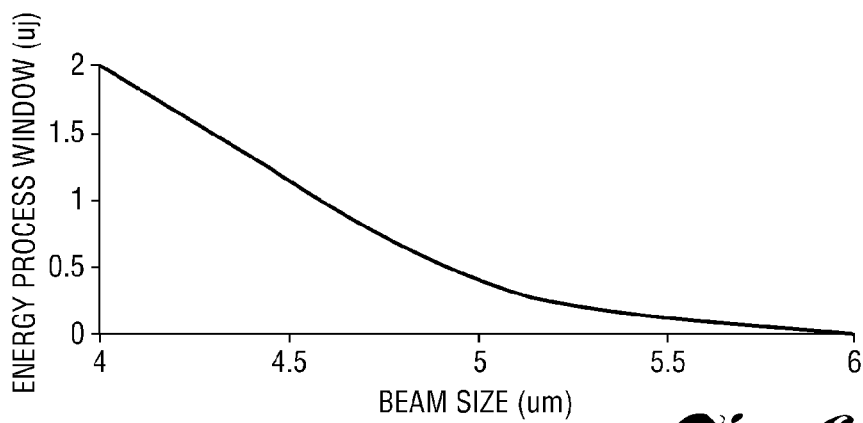
FIG. 6 is a graph of energy process window (in micro-joules) versus beam size (in microns) which shows the process window as a function of spot size on copper links; the energy process window (in micro-joules) here is the range of the laser pulse energies between the minimum energy needed for severing the links and the maximum energy at which dark spot observed under the links.

Since the links are 2 μm wide, there is almost no process window with a 6 μm beam as the damage is always occurring before the link is cleanly blown. The process window is the most when the beam size is around 4 μm, as illustrated in the graph of FIG. 6. This graph is for processing copper links with 2 μm width and using the IPG laser at 13 ns pulse width.

In like fashion, gold link wafers were processed with the system of FIG. 2. The gold links are 2 μm wide with a 16.5 μm pitch. The trimming system includes a fiber laser to generate shaped pulses with adjustable pulse widths, in this case, a square pulse shape. The spot size on the targets was about 4 μm. Die reference marks near each link bank (i.e., 40 links per bank) were used to confirm that the focal plane height was correct prior to link blasting.

Links were processed using 7 ns, 13 ns, and 21 ns pulse widths. All links were processed using polarization across the links as it gives the best results in terms of process window.

Results

The following table is a summary of the clean blow and darkening thresholds.

| Pulse width (ns) | Link visually severed threshold (μJ) | Link underside dark spot appearance threshold (μJ) |
|---|---|---|
| 7 | 2.2 | 2.4 |
| 13 | 1.2 | 2.6 |
| 21 | 1.2 | 1.8 |

It is clear that for processing gold links, the pulse shape, as well as the pulse width, are important for the best process window. In other words, the process window depends on both the pulse width and pulse shape.

The graph of FIG. 7 shows the dependence of energy process window on the laser pulse width for gold links.

Figure 8:
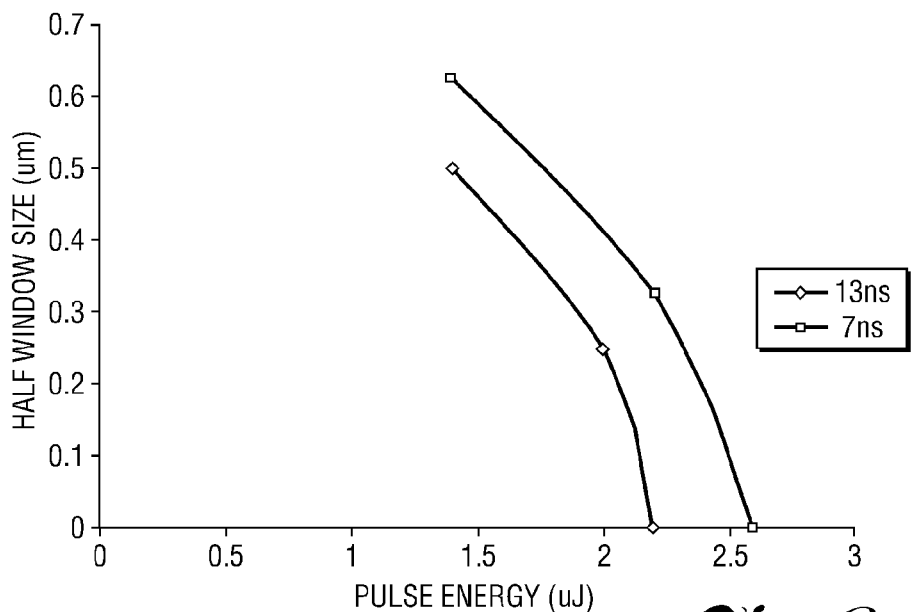
FIG. 8 illustrates a pair of graphs, one for 13 ns pulse width and the other for 7 ns pulse width, of positioning accuracy half window size (in microns) versus pulse energy (in micro-joules) which show beam position accuracy window with 4 microns on gold links; this graph indicates the variation in maximum pulse energy that can be applied to the link as a function of spot position relative to the center of the link, without causing the optically observed damage; the half window here represents the maximum spot position deviation from the center of the link achieved at each laser pulse energy without observing optical damage.

Positioning accuracy tests shown in FIGS. 5 and 8 were carried out by offsetting the center of the beam away from the center of the links and visually observing damage to each link. Each graph shows the observed damage energy threshold vs. the position offset. Maximum energy values shown correspond to near-ideal, spot-to-link alignment. The energy process window accounts for processing system positioning errors and is generally less than the maximum energies shown in FIGS. 5 and 8. The graphs of FIGS. 5 and 8 show the beam positioning window for 4 μm spot size on wafers using copper and gold links, respectively, using an IPG laser. The above-noted tests are similar to the Venier run test described in Chapter 19 of LIA HANDBOOK OF LASER MATERIALS PROCESSING, entitled "Link Cutting Making" (particularly FIG. 11 of that chapter).

Beam spot sizes have an impact on the process window for gold links, similar to copper links.

An IPG fiber laser may be used in one embodiment of a system of the present invention to generate pulse widths which are adjustable from 5 ns to 21 ns. The duration can be extended to 50 ns or longer, such as 200 ns and can be contracted to 1 ns as indicated in FIG. 3.

In another embodiment of the system, a 1.3 micron fiber laser (Erbium-doped amplifier and a 1.3 micron laser diode) may be used to exploit the wavelength-sensitive transmissive property of the silicon substrate and, when combined with the square-shaped pulse and selectable pulse width, may provide further process window improvements.

Typical laser processing conditions:
(A) Metal link blowing:
2 μm wide Copper links: pulse width 13-16 ns, process energy 1 μj-4 μj
2 μm wide gold links: Pulse width 7-16 ns, process energy 0.2-4.2 μj
(B) Thin Film resistor trimming:
SiCr: Usually short pulse work better—7-13 ns, energy 0.05-0.5 μj
NiCr: Usually longer pulse work better: 25-50 ns, 0.1-0.5 μj tantalum nitride: 25-50 ns, 0.1-0.5 μj
(C) Thick Film resistor trimming:
Pulse width, 7-50 ns, 1-40 μj.

A single pulse-shaped and pulse width tunable laser in a laser processing system may be provided for link blowing as well as thin and thick film resistor trimming.

A pulse of the pulse-shaped laser may have a pulse energy from 0.1 μj to 100 μj, typical 20-40 μj.

The pulse-shaped laser may have a pulse repetition rate of 1 KHz to 200 KHz, typical 1 to 50 KHz.

A pulse of the pulse-shaped laser may have a rise time less than 1.5 ns and fall time of less than 2 ns.

A pulse of the pulse-shaped laser may have a square pulse shape.

The pulse-shaped laser may have tunable or adjustable pulse widths (durations) from 1 ns to 200 ns, typical from 4 ns to 50 ns.

A pulse of the pulse-shaped laser may have a TEM 00 beam.

The pulse-shaped laser may use a MOPA configuration. The seeder may be either a semiconductor laser or a Q-switched laser, and the amplifiers may be a fiber laser.

The pulse-shaped laser may be a fiber laser.

A pulse of the pulse-shaped laser may have a wavelength of 0.2 μm to 2.5 μm. For instance, a green wavelength (532 nm) or ultraviolet wavelength (355 nm) obtained by shifting the output wavelength of a near IR fiber laser amplifier.

A pulse of the pulse-shaped laser may have a wavelength of about 1 μm, for example, 1.064 microns.

A pulse of the pulse-shaped laser may have a wavelength of 1.2 μm.

A pulse of the pulse-shaped laser may have a wavelength of 1.3 μm.

One such laser may be a conventional fiber laser from IPG, and used in memory repair systems of the assignee of the present application. A plurality of closely-spaced pulses generated in rapid succession may be used in certain embodiments, for example, prior to measurement.

The method and system of one embodiment of the present invention may process:

Thin films like SiCr, NiCr-based or tantalum nitride, thin film resistors formed on die of semiconductor wafers; and Link fuses, such as polysilicon, copper, aluminum, or gold link fuses.

In one embodiment, all targets of the same or similar material on all of the die of the wafer are processed before changing pulse width and/or shape. In another embodiment, pulse width and/or shape is changed during processing of different materials on a single die.

In one embodiment, both passive and functional trimming can be performed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for laser processing first and second targets on a workpiece, the system comprising:
    a laser subsystem including an oscillator having a single tunable or adjustable pulse width, semiconductor laser and a fiber-based amplifier for generating one or more laser pulses;
    a first controller operatively connected to the laser subsystem to:
        set a laser pulse width of the one or more laser pulses to selectively provide one or more laser output pulses having one or more set pulse widths based on the first target to be processed;
        set a pulse shape of the one or more output pulses to selectively provide the one or more output pulses having the set pulse shape based on the first target; and
        reset the laser pulse width of one or more laser pulses to selectively provide one or more laser output pulses having one or more reset pulse widths based on a second target to be processed;
    a laser beam delivery subsystem including an optical subsystem having a lens for delivering at least a portion of the output pulses having the set pulse shape and the set and reset pulse widths to the first and second targets, respectively, based on position information; wherein the optical subsystem adjusts at least one of spot size and the focus of the laser beam on the at least one target; and wherein the lens has a scan field of at least 10 mm by 10 mm, a working distance of at least 40 mm to provide access for contacting probes and produces a spot having a spot size of 6 microns or less;
    a sensor subsystem including an optical sensor for sensing a laser pulse reflected from the workpiece to obtain a signal;
    a signal processor for processing the signal to obtain alignment information for laser processing;
    a liquid crystal variable retarder for optically processing the laser beam;
    an liquid crystal variable retarder controller for controlling the LCVR; and
    a positioning mechanism for providing relative motion between the workpiece and the laser beam.

2. The system as claimed in claim 1, wherein the output pulses have a rise time of less than 1.5 nanoseconds and a fall time of less than 2 nanoseconds.

3. The system as claimed in claim 1, wherein the laser beam delivery subsystem further includes an A-O modulator to selectively delivers the deliver output pulses to the targets based on position information.

4. The system as claimed in claim 1, wherein the laser subsystem has a MOPA configuration.

5. The system as claimed in claim 1, wherein the laser has an output coupler and a laser cavity and wherein geometry and dimensions of the laser cavity are adjusted and reflectivity of the output coupler is adjusted to set the pulse width.

6. The system as claimed in claim 1, wherein the first controller is configured to reset the pulse width by changing pulse energy level of the laser of the laser subsystem.

7. The system as claimed in claim 1, wherein the first controller is configured to reset the pulse width by changing repetition rate of the laser of the laser subsystem.

8. The system as claimed in claim 1, wherein the laser pulse is reflected from a link in a group of links to be laser processed.

9. The system as claimed in claim 1, wherein the laser beam is initially linearly polarized and wherein the liquid crystal variable retarder controllably rotates the linearly polarized laser beam based upon orientation of the targets.

10. The system as claimed in claim 1, wherein the laser beam has an initial polarization and wherein the liquid crystal variable retarder controllably converts the initial polarization to a desired polarization.

11. The system as claimed in claim 1, wherein the optical subsystem includes adjustment means for adjusting at least one of spot size and the focus of the laser beam on at least one of the targets.

12. The system as claimed in claim 1, wherein the controller and the laser are configured to set and reset a laser pulse width of the one or more laser pulses in a range from 1 to 200 nanoseconds and to generate the pulses at a repetition rate in a range from 1 kHz to 200 kHz.

13. The system as claimed in claim 1, wherein the output pulses have a wavelength in the range of 0.2 microns to 2.5 microns.

14. The system as claimed in claim 13, wherein the wavelength is one of about 1 micron, about 1.2 microns, about 1.3 microns, about 0.532 microns and about 0.355 microns.

15. The system as claimed in claim 1, wherein the laser pulse is reflected from an alignment feature of the workpiece, and wherein the alignment feature has a width from ½ to 2 times the diameter of a laser spot delivered to the target.

16. The system as claimed in claim 15, wherein width of the alignment feature is substantially equal to spot diameter.

* * * * *

UNITED STATES PATENT AND TRADEMARK OFFICE
CERTIFICATE OF CORRECTION

| | | |
|---|---|---|
| PATENT NO. | : 8,541,714 B2 | Page 1 of 1 |
| APPLICATION NO. | : 12/793306 | |
| DATED | : September 24, 2013 | |
| INVENTOR(S) | : Bo Gu et al. | |

It is certified that error appears in the above-identified patent and that said Letters Patent is hereby corrected as shown below:

In the Claims

Column 12, Line 14, Claim 3:

After "selectively" delete "delivers the"

Signed and Sealed this
Sixth Day of May, 2014

Michelle K. Lee
*Deputy Director of the United States Patent and Trademark Office*